United States Patent [19]

Sullivan

[11] Patent Number: 4,611,847
[45] Date of Patent: Sep. 16, 1986

[54] INFLATABLE AND EXTENDABLE VEHICLE SKIRT

[75] Inventor: John T. Sullivan, Fort Wayne, Ind.

[73] Assignee: Navistar International Corporation, Chicago, Ill.

[21] Appl. No.: 789,050

[22] Filed: Oct. 18, 1985

[51] Int. Cl.$^4$ .............................................. B62D 35/00
[52] U.S. Cl. ...................................................... 296/1 S
[58] Field of Search .................... 296/1 S, 91; 105/2 R

[56] References Cited

U.S. PATENT DOCUMENTS

| 3,834,752 | 9/1974 | Cook et al. | 296/1 S |
| 3,945,677 | 3/1976 | Servais | 296/1 S |
| 4,036,519 | 7/1977 | Servais | 296/1 S |

Primary Examiner—Robert R. Song
Attorney, Agent, or Firm—F. David AuBuchon; Dennis K. Sullivan

[57] ABSTRACT

An inflatable and extendable skirt for reducing the air drag caused by a moving motor vehicle such as a truck. The skirt is normally rolled up on itself and can be extended, as between parts of the vehicle, upon introduction of the compressed air into the pocket chambers secured to the skirt. The skirt can be inflated or deflated automatically when the motor vehicle passes a predetermined speed or whenever an operator feels it is beneficial to inflate or deflate one or a plurality of skirts.

9 Claims, 9 Drawing Figures

U.S. Patent  Sep. 16, 1986  4,611,847
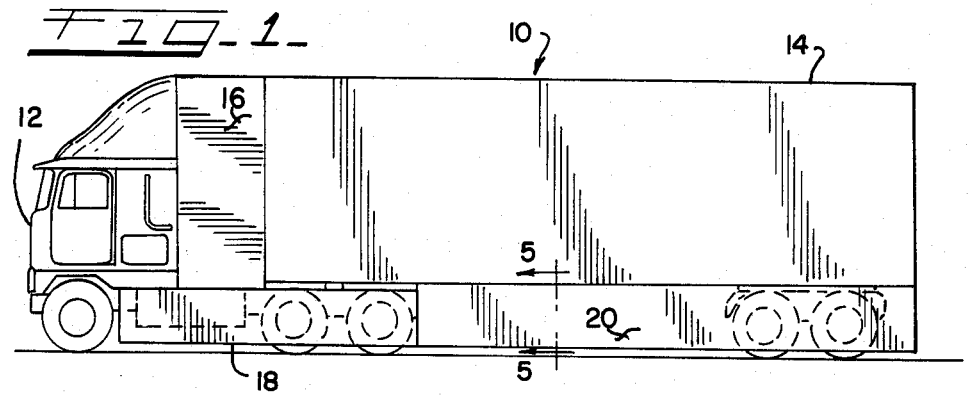
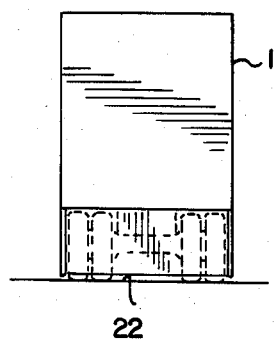
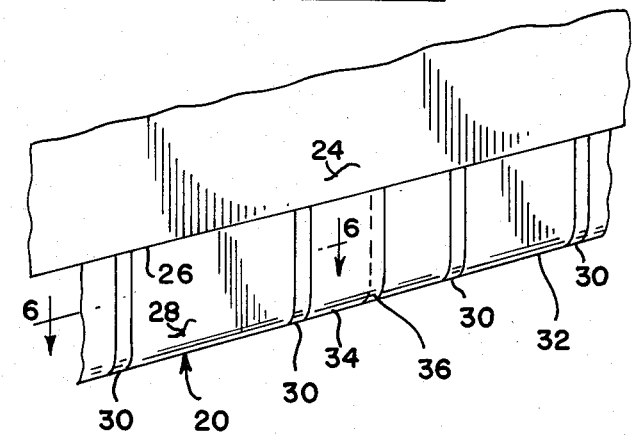
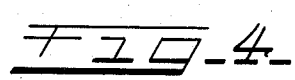
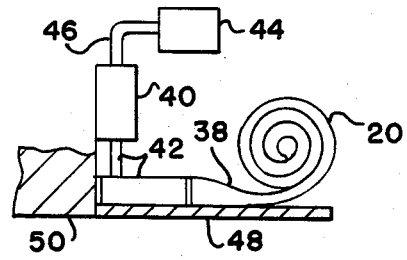
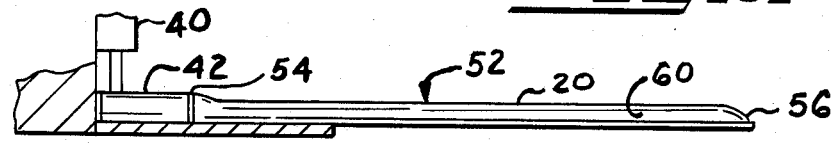
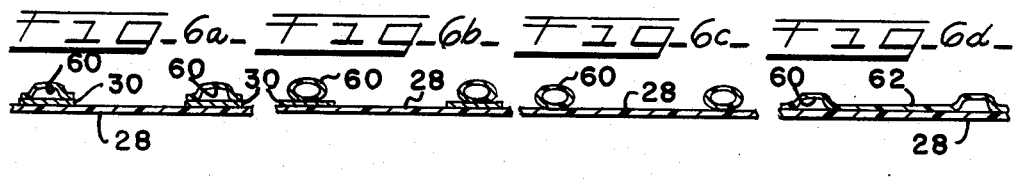

4,611,847

INFLATABLE AND EXTENDABLE VEHICLE SKIRT

BACKGROUND OF THE INVENTION

1. Field of the Invention

This invention pertains to inflatable streamlining and aerodynamic improvement structures and more particularly to an extendable and inflatable aerodynamic side fairings for motor vehicles.

INFORMATION DISCLOSURE STATEMENT

Heretofore, various extendable structures have been disclosed which can be exemplified in the following patents. For instance, the U.S. Pat. No. 4,036,519 issued to Servais et al., discloses an air inflated bag extending between the cab and the trailer body to provide for a smooth non-turbulent flow of air around the cab and to the side and top walls of the trailer body for reducing the aerodynamic drag on the tractor-trailer vehicle. A low flow of air may be provided through the bag for supplying air to an air conditioning or refrigeration system.

Another U.S Pat. No. 4,030,799 issued to Johnson discloses an inflatable attachment to a trailer front wall so that a smooth streamlined contour is presented to the wind.

Further, U.S. Pat. No. 3,945,677 discloses an air inflated bag functioning as an air deflector for streamlining the air flow over the tractor to the trailer and being adapted to partially collapse by the trailer in response to the articulation turning of the vehicle.

The above-identified patents do not address improvements of the aerodynamic shape of a vehicle by skirting on a side of a truck or a trailer which would produce a significantly beneficial effect on fuel economy by reducing aerodynamic drag. Tractors have some "integral" skirting formed by fuel tanks on their side. Most truck and trailer bodies, however, are not skirted due to the practice of loading and unloading from the rear of the vehicle body.

Heretofore, the problem with skirting was that fixed or hinged side panels severely limited ground clearance, thereby restricting the vehicle's mobility over uneven terrain. They also inhibit access to the underside of a vehicle for service work.

The subject invention resolves the above identified problems by providing an extendable side fairing for a truck or trailer which rolls up and which can be extended preferably by compressed air. The subject invention is explained with greater specificity hereinbelow.

SUMMARY OF THE INVENTION

According to the present invention, an inflatable and extendable skirt assembly is attached to a vehicle body. The skirt comprises a resilient sheet having fluid pockets integral therewith which preferably are inflatable by compressed air and retraction means which cause the sheet to roll up into a coiled deflated position close to the vehicle body. The skirt covers the space between the vehicle body elements in its extended inflated position.

BRIEF DESCRIPTION OF THE DRAWINGS

FIG. 1 is a schematic view of a motor vehicle comprising a cab and a trailer;

FIG. 2 is a rear view thereof;

FIG. 3 is a skirt assembly attached to a motor vehicle body;

FIG. 4 is a schematic partly sectional view of the skirt assembly in its deflated inoperable position;

FIG. 5 is a sectional view of the skirt assembly in its inflated position; and

FIGS. 6a, 6b, 6c, and 6d are a series of sectional views of various embodiments of the aerodynamic skirt assembly taken along the line 6—6 of FIG. 3.

DESCRIPTION OF THE PREFERRED EMBODIMENT

Referring now to the drawings wherein reference characters designate like or corresponding parts throughout the several views, there is shown in FIG. 1 a truck 10 having a motor cab 12 connected with a trailer 14. The skirts 16, 18 and 20 shown in their inflated positon cover the gaps along the cab side fairings, the bottom portion of the cab and trailer front section, and trailer bottom clearance area. The skirt 22 shown in FIG. 2 extends to cover the rear end of a truck mainly to prevent mud and water splashing. Since the structure and operation of skirts 16, 18, 20, and 22 are substantially similar, only skirt 20 will be described.

As shown in FIG. 3, the skirt 20 is attached along one edge 26 to the trailer or truck body 24 and extends downwardly from the bottom corner of a side thereof. The skirt 20 comprises a flexible inelastic sheet 28 having a series of stiffeners 30 attached thereto or inserted thereinside which could be spring steel strips naturally coiled in the skirt deflated position. Thus, in the absence of an extending force, the skirt 20 will assume a retracted position coiled or rolled up on an axis perpendicular to the edge 26. In its extended position, the skirt 20 assumes a generally planar configuration although some curling is permissible for the downwardly extending skirts 18, 20, 22, which form a continuation of the side wall of the cab or trailer as appropriate.

The skirt 20 in its coiled or rolled up and deflated position, as best shown in FIG. 4, has an air receiving section 38 connected to a control valve 40 via a duct means 42 shown diagrammatically in FIG. 4. The control valve 40 is connected with the vehicle air supply system 44 through a line 46. The control valve 40 is preferably responsive to vehicle speed to extend the skirt 20 upon the vehicle exceeding a preselected speed, for example, 35 miles per hour, and to deflate it upon the vehicle fall below that or a different preselected speed Also, in FIG. 4 there is shown a flange 48 extending from a vehicle body 50 which partially supports and guides the skirt 20 into its fully extended position shown in FIG. 5 and protects it in its rolled up position.

The skirt skin or sheet 28 is rigidly attached to elongated fluid pocket means 52 disposed perpendicular to the edge 26 or parallel to stiffener 30 and connected to the supply line 42 at the joint 54. The pocket means 52 have an edge 56 sealing the fluid chambers 60. Various embodiments of the fluid chambers 60 secured to stiffeners 30 or to the outer skin 28 (being independent of each other or being combined by an inner sheet 62 which is secured to the outer sheet 28) are illustrated in FIGS. 6a, 6b, 6c, and 6d. The skirt could be made out of two pieces of flexible material which would form a sealed fluid chamber between them. The skirt is coiled or rolled up in its deflated transportation position. Preferably compressed air is used as the actuating fluid.

However, hydraulic fluid from a suitable pressure source could also be used.

The inflatable and extendable skirt can cover various zones of a vehicle body. For example, it can cover all or a part of a distance from the trailer bottom to the ground. The space between trailer wheels and tractor wheels should be covered as tight as practically possible. Another zone amenable to filling by skirts is the hiatus between a cab side wall and the front of a trailer (between sides and top portions thereof) as shown by the skirt 16. The side fairings are more beneficial for air drag reduction than closure of the horizontal gap between the cab roof fairing and the trailer.

The skirt inflation can be actuated by an operator from a tractor cab through direct control of valve 40 or it can be automatically activated when the vehicle speed increases to a predetermined limit, or anytime when the trailer is attached to a tractor. Conceivably, applying the vehicle brakes could cause the skirts to deflate and retract. Flexible tubes 52 can be connected with a series of rigid tubes and flanges, which extend from the vehicle body for guiding and supporting the skirt.

When slideable bogies are used on a trailer (not shown), the slideable and overlapping sections of the skirt 20 can form a uniform skirt or wall. For instance, skirt section 32 slides over toward another skirt section 34, thus forming the double strip 36. The best solution for sliding bogies may be to have fairings attached to the sliding bogies with an extension going sufficiently forward to provide a continuous coverage of the units located ahead in the path of the air stream. Bogie fairings would slide under the skirt toward each other, when the bogie is placed in the forward position.

Other combinations of partially solid and partially inflatable skirt can be used; for example, the skirt can be permanently attached to the trailer or can be detachably connected thereto.

One of the most important advantages of the subject application is the ability to reduce the air drag created by a motor vehicle operating at highway speeds. The vehicle body equipped with skirts becomes more steamlined and aerodynamically efficient, thereby reducing the drag coefficient. The aforementioned skirts which may be inflatable and extendable for covering the hiatus between the vehicle parts upon any predetermined condition lends itself to various combinations of actuating conditions and factors.

While some embodiments of the invention have been illustrated and described herein, various changes and modifications may be made therein without departing from the spirit of the invention as defined by the scope of the appended claims.

What is claimed is:

1. An extendable skirt for a highway truck comprising;
   a resilient inelastic sheet having an edge secured to said truck, said sheet having a retracted position rolled up on itself about an axis parallel to said edge and a planar extended position;
   retraction means operatively associated with said sheet to cause said sheet to assume said retracted position in the absence of an extending force;
   elongated fluid pocket means disposed on said sheet perpendicular to said edge;
   a source of pressurized fluid associated with and powered by said vehicle, and
   selectively actuable control valve means connecting said pressurized fluid source with said elongated pocket means for causing said skirt to assume said extended position.

2. The invention in accordance with claim 1 and said retraction means comprising spring elements attached to said sheet parallel to said elongated pocket means, said spring elements being normally coiled.

3. The invention in accordance with claim 2 and said pressurized fluid comprising air.

4. The invention in accordance with claim 1 and said selectively actuable control valve means being responsive to truck speed and being configured to automatically extend said skirt upon said truck exceeding a predetermined speed.

5. The invention according to claim 1 and said truck comprising a tractor having a cab, said skirt being attached thereto and disposed to form, in said extended position, a rearwardly extending continuation of a side wall thereof.

6. The invention in accordance with claim 1 and said truck comprising a tractor-trailer combination, said skirt being attached to said trailer and disposed to form, in said extended position, a downward continuation of a side wall thereof.

7. The invention in accordance with claim 6 and a plurality of said skirts being attached to said trailer to form a continuation of said side wall.

8. An inflatable and extendable skirt assembly attachable to a vehicle body comprising:
   a resilient sheet having one end thereof secured to a vehicle body, said sheet being rolled into an original deflated position and rolled out in an extended inflated position, said sheet covering space between vehicle body elements in its extended inflated position, said end being connected with a vehicle compressed air supply system;
   air pocket means integral with said sheet and connected to said end for communication with said air supply system, said air pocket means comprising a series of air chambers sealed at one end thereof and said chambers rolling out said skirt upon introduction of an air flow thereinto; and
   retraction means for returning said sheet into said original deflated position.

9. An inflatable and extendable skirt assembly attachable to a vehicle body comprising:
   a resilient sheet having one end thereof being secured to a vehicle body, said sheet being rolled up in an original deflated position and rolled out in an extended inflated position, said sheet covering the space between vehicle body elements in its extended inflated position, said end being connected with a vehicle compressed air supply system;
   air pocket means being integral with said sheet and connected to said end for communication with an air supply system, said air pocket means being disposed on and attached to an interior side of said skirt;
   retraction means for returning said sheet into its original deflated position.

* * * * *